US012803297B2

(12) United States Patent
Brice

(10) Patent No.: US 12,803,297 B2
(45) Date of Patent: Nov. 17, 2026

(54) SOLAR POWERED BATTERY CHARGING SYSTEM FOR INDUSTRIAL INSTRUMENTATION

(71) Applicant: Byron Brice, Battle Mountain, NV (US)

(72) Inventor: Byron Brice, Battle Mountain, NV (US)

( * ) Notice: Subject to any disclaimer, the term of this patent is extended or adjusted under 35 U.S.C. 154(b) by 710 days.

(21) Appl. No.: 18/453,511

(22) Filed: Aug. 22, 2023

(65) Prior Publication Data

US 2024/0128790 A1 Apr. 18, 2024

Related U.S. Application Data

(60) Provisional application No. 63/416,976, filed on Oct. 18, 2022.

(51) Int. Cl.

*H02J 7/35* (2006.01)
*H02J 7/50* (2026.01)
*H02J 7/90* (2026.01)
*H02S 40/38* (2014.01)

(52) U.S. Cl.

CPC .................. *H02J 7/35* (2013.01); *H02J 7/50* (2026.01); *H02J 7/933* (2026.01); *H02S 40/38* (2014.12)

(58) Field of Classification Search

CPC ..... H02J 7/35; H02J 7/50; H02J 7/933; H02S 40/38

See application file for complete search history.

(56) References Cited

U.S. PATENT DOCUMENTS 4,563,727 A 1/1986 Curiel
4,808,904 A * 2/1989 Ricaud ...................... H02J 7/35 320/101
5,184,502 A * 2/1993 Adams .................... H02S 99/00 320/137
5,793,184 A 8/1998 O'Connor
6,803,742 B1 10/2004 Visciano
7,692,411 B2 * 4/2010 Trainor ................. H01M 10/46 320/167

(Continued)

FOREIGN PATENT DOCUMENTS

CN 109274594 A * 1/2019 ............. H04L 45/60
DE 202009012500 U1 * 12/2009 ............... G07F 9/00

*Primary Examiner* — Jared Fureman

(74) *Attorney, Agent, or Firm* — Brennan, Manna & Diamond, LLC

(57) ABSTRACT

An industrial instrumentation's solar powered battery charging system designed as a plug and play solution for industrial instruments. The system includes a frame with an angled mounting surface for easy installation on any supporting surface. The system includes a plurality of rechargeable batteries that replace non-functioning lithium-ion batteries of the industrial instrument, eliminating the need for their removal. The system also features a battery controller module integrated with the device, ensuring controlled recharging of the batteries by preventing overcharging and overheating. In addition, the system incorporates a plurality of photovoltaic panels for harnessing solar energy and converting it into electric power for recharging the batteries. The flow of electric current from the photovoltaic panels to the batteries is regulated by the module, thereby preventing overheating and overcharging.

20 Claims, 6 Drawing Sheets

(56) References Cited

U.S. PATENT DOCUMENTS

| | | | | |
|---|---|---|---|---|
| 2009/0273309 | A1 | 11/2009 | Kuo | |
| 2011/0095719 | A1 | 4/2011 | Strickland | |
| 2011/0266993 | A1* | 11/2011 | Vaish | H01M 10/465<br>320/101 |
| 2018/0097469 | A1* | 4/2018 | Yoshida | H02S 40/36 |
| 2019/0149084 | A1 | 5/2019 | Williams | |

* cited by examiner

SOLAR POWERED BATTERY CHARGING SYSTEM FOR INDUSTRIAL INSTRUMENTATION

CROSS-REFERENCE TO RELATED APPLICATION

The present application claims priority to, and the benefit of, U.S. Provisional Application No. 63/416,976, which was filed on Oct. 18, 2022 and is incorporated herein by reference in its entirety.

FIELD OF THE INVENTION

The present invention generally relates to the field of solar charging devices. More specifically, the present invention relates to a novel solar powered battery charging system specifically designed for industrial instrumentation. The system is in the form of a device that includes a frame to house a plurality of rechargeable batteries, a computer chip to control the recharging of the batteries, and a plurality of photovoltaic panels to absorb solar energy and provide the electric power to the rechargeable batteries. Accordingly, the present disclosure makes specific reference thereto. Nonetheless, it is to be appreciated that aspects of the present invention are also equally applicable to other like applications, devices, and methods of manufacture.

BACKGROUND

By way of background, lithium batteries are commonly used as a power source in industrial instruments such as portable analyzers, measurement instruments, data loggers, monitoring equipment, and other types of instruments. Lithium batteries provide high energy density and power to instruments used in industrial settings. However, over time and with continuous usage, lithium batteries experience a reduction in their capacity to hold a charge. As a result, lithium batteries become less effective at powering industrial instruments and instruments may not function properly or might not work at all without a reliable power source. This can lead to operational disruptions, decreased productivity, or even complete shutdown of the equipment.

Replacing lithium batteries in industrial equipment is time consuming and expensive. Industrial-grade instruments often require specific types and configurations of batteries, which are not readily available in regular retail stores. Therefore, finding suitable replacements for the specialized lithium batteries can be challenging. Furthermore, the cost of replacing industrial-grade lithium batteries can be significant. These batteries are often more expensive than standard consumer batteries due to their higher capacity, specialized design, and the need to meet stringent safety and performance standards. People desire a system that offers an easy and cost-effective way of replacing dead or non-functioning Lithium-ion batteries.

Therefore, there exists a long felt need in the art for a recharging system that can replace existing non-functional and dead Lithium batteries in industrial instruments. There is also a long felt need in the art for a recharging system that can be plugged into an instrument for providing electric power to the instrument. Additionally, there is a long felt need in the art for a recharging device that includes Li-ion batteries for providing power to an instrument. Moreover, there is a long felt need in the art for a solar powered battery charging system that generates electric power in a controlled manner to industrial instruments. Further, there is a long felt need in the art for a solar powered battery charging system that replaces dead or non-functioning lithium-ion batteries that cannot be recharged. Finally, there is a long felt need in the art for a solar powered battery charging system that offers a way to power electronics with renewable energy rather than expensive lithium-ion batteries.

The subject matter disclosed and claimed herein, in one embodiment thereof, comprises a solar powered battery charging system for industrial instrumentation and other electrical products. The system is in the form of a plug and play device that can replace dead and non-functional lithium-ion batteries. The system includes a frame, a plurality of rechargeable Lithium batteries stored within the frame to provide electric power to the industrial instrument, a battery control module integrated with the device for controlling recharging of the rechargeable batteries to prevent overcharging and overheating of the rechargeable batteries, and a plurality of photovoltaic panels for absorbing solar energy and converting the absorbed solar energy into electric power to recharge the rechargeable batteries. The battery control module is also configured to monitor supply from the rechargeable batteries to the instrumentation to prevent overflow of power.

In this manner, the solar powered battery charging system of the present invention accomplishes all of the forgoing objectives and provides users with a solar powered battery charging system for industrial instrumentation. The system replaces dead or non-functioning lithium-ion batteries that cannot be recharged and offers a way to power electronics with renewable energy rather than expensive lithium-ion batteries. The device can be designed to fit different instruments and electronics.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a solar powered battery charging system for industrial instrumentation. The system is in the form of a plug and play device and further comprising a frame with a cover panel having an angled mounting surface for versatile mounting on a supporting surface, a plurality of rechargeable Lithium batteries stored within the frame to provide electric power to the industrial instrument, a battery controller module integrated with the device for controlling recharging of the rechargeable batteries to prevent overcharging and overheating of the rechargeable batteries, a plurality of photovoltaic panels integrated in a second panel of the frame for absorbing solar energy and converting the absorbed solar energy into electric power to recharge the rechargeable batteries.

In a further embodiment, the second panel is dimensioned to fit along the channels positioned in the first panel, facilitating electrical coupling with the batteries and the battery controller module.

In yet another embodiment, a method for utilizing a solar based recharging device for providing electrical power to an industrial instrument is described. The recharging device is coupled to the instrument using a connecting wire and method further comprising plugging the recharging device into the industrial instrument to provide electric power for the instrument, wherein the recharging device is either plugged into a slot or supported using an angled mounting surface, electrically coupling the recharging device to the instrument using a connecting wire, wherein the connecting wire is compatible with charging or electrical ports of different industrial instruments and may vary in length, and transmitting electric power stored in the rechargeable batteries of the device to the connected industrial instrument, thereby facilitating smooth operation of the instrument without requiring replacement of the lithium batteries of the instrument wherein the electric power in the device is generated by a plurality of integrated photovoltaic cells.

In a further embodiment, a method for controlling power flow in a solar based battery charging system used for providing power to an industrial instrument is described. The method comprising the steps of providing the charging system, the system includes photovoltaic cells, an integrated battery control module and rechargeable batteries. The method also includes configuring a battery control module to the maximum power level of the integrated rechargeable batteries, controlling the flow of electric current from the photovoltaic panels to the rechargeable batteries using the battery control module, determining the power level of the rechargeable batteries and comparing the determined power level to a threshold, and applying a power cut-off by the battery control module to reduce the supply of electric power from the photovoltaic panels to the rechargeable batteries when the power level of the batteries exceeds the threshold.

In a further embodiment, the controller reduces power supply from the batteries to an instrument when the power supply is more than a target power level of the instrument.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1A:
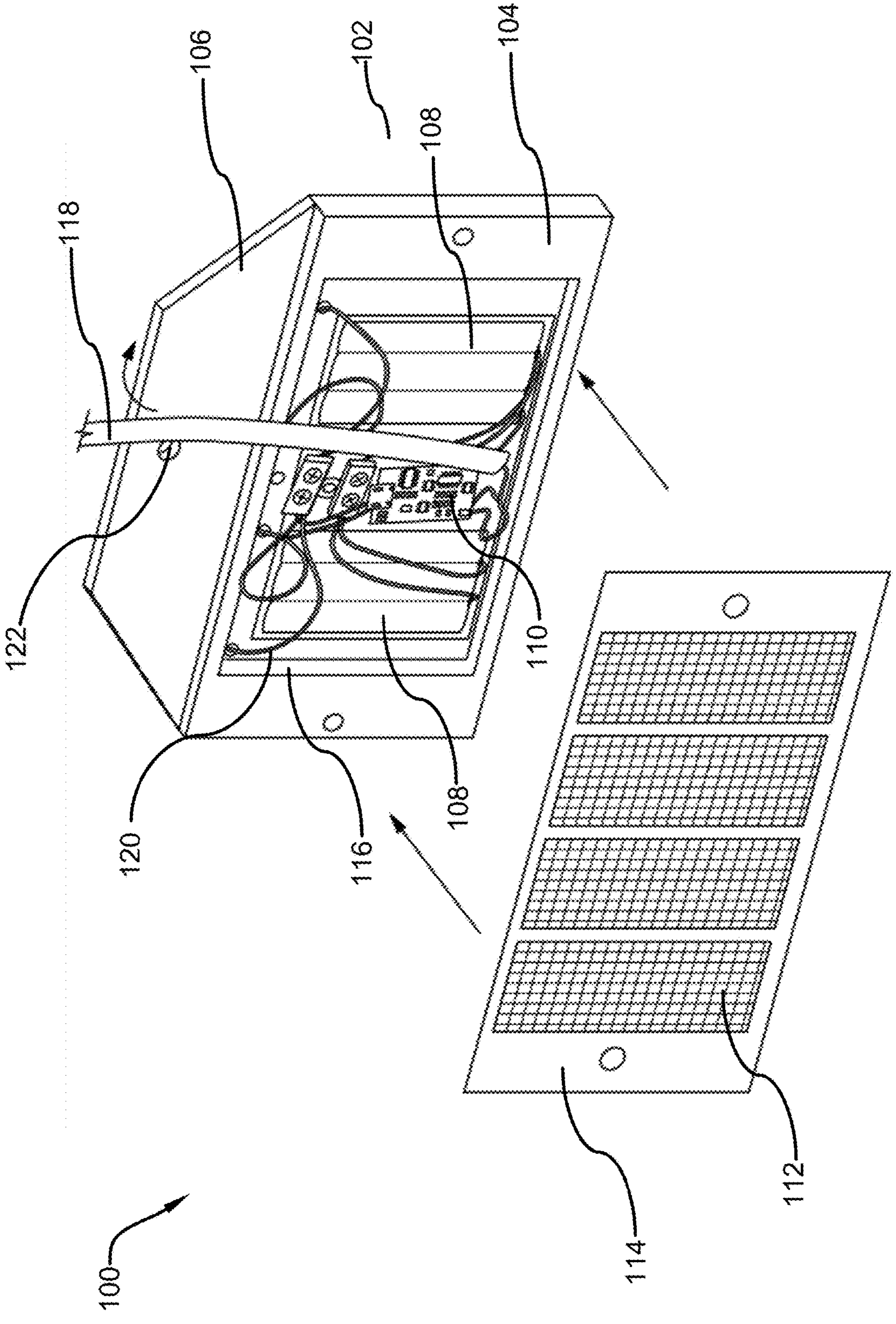
FIG. 1A illustrates a perspective view of an industrial instrumentation's solar powered battery charging system of the present invention in an unassembled form in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a recharging system that can replace existing non-functional and dead Lithium batteries in industrial instruments. There is also a long felt need in the art for a recharging system that can be plugged into an instrument for providing electric power to the instrument. Additionally, there is a long felt need in the art for a recharging device that includes Li-ion batteries for providing power to an instrument. Moreover, there is a long felt need in the art for a solar powered battery charging system that generates electric power in a controlled manner to industrial instruments. Further, there is a long felt need in the art of a solar powered battery charging system that replaces dead or non-functioning lithium-ion batteries that cannot be recharged. Finally, there is a long felt need in the art for a solar powered battery charging system that offers a way to power electronics with renewable energy rather than expensive lithium-ion batteries.

The present invention, in one exemplary embodiment, is a method for utilizing a solar based recharging device for providing electrical power to an industrial instrument is described. The recharging device replaces dead Lithium batteries and is coupled to the instrument using a connecting wire. The method further comprising plugging the recharging device into the industrial instrument to provide electric power for the instrument, wherein the recharging device is either plugged into a slot or supported using an angled mounting surface, electrically coupling the recharging device to the instrument using a connecting wire, wherein the connecting wire is compatible with charging or electrical ports of different industrial instruments and may vary in length, and transmitting electric power stored in the rechargeable batteries of the device to the connected industrial instrument, thereby facilitating smooth operation of the instrument without requiring replacement of the lithium batteries of the instrument wherein the electric power in the device is generated by a plurality of integrated photovoltaic cells.

Referring initially to the drawings, FIG. 1A illustrates a perspective view of industrial instrumentation's solar powered battery charging system of the present invention in an unassembled form in accordance with the disclosed architecture. The industrial instrumentation's solar powered battery charging system 100 of the present invention is designed as a 'plug and play' system for utilizing with industrial instruments. More specifically, the charging device 100 includes a frame 102 that has a cover panel 104 with an angled mounting surface 106 enabling a user to mount the device 100 on any supporting surface. The frame 102 is designed to store a plurality of rechargeable batteries 108 which provide electric power to the industrial instrument to which the charging device 100 is plugged. The rechargeable batteries 108 included in the device 100 replace dead or non-functioning lithium-ion batteries of the industrial instrument and therefore, eliminates requirement of removing the non-functioning lithium-ion batteries.

A battery controller module 110 is integrated with the device 100 and is configured for controlling recharging of the rechargeable batteries 108. The battery controller module 110 prevents the batteries 108 from getting over-charged and also prevents overheating of the batteries 108. In the preferred embodiment, the battery controller module 110 controls charging of the batteries 108 to the maximum level of electric power required for functioning of the instrument in which the recharging device 100 is plugged into as described in FIG. 4.

Figure 1B:
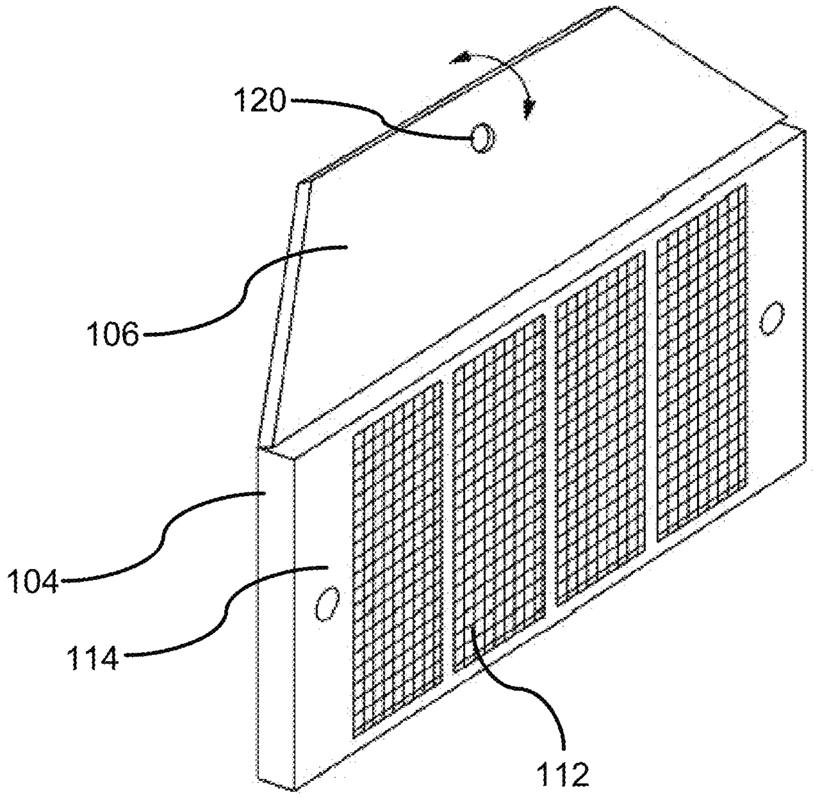
FIG. 1B illustrates a perspective view of the industrial instrumentation's solar powered battery charging system of the present invention in an assembled form in accordance with the disclosed architecture.

A plurality of photovoltaic panels 112 integrated in a second panel 114 are used for recharging the rechargeable batteries 108. The plurality of photovoltaic panels 112 are configured to absorb solar energy to convert into the electric power for recharging the rechargeable batteries 108. The flow of electric current from the photovoltaic panels 112 to the rechargeable batteries 108 is controlled by the module 110, thereby prohibiting overheating and overcharging of the batteries 108. The second panel 114 is dimensioned to fit along the channels 116 positioned in the first panel 104 to make an electrical coupling with the batteries 108 and to cover the batteries 108 and the module 110 as illustrated in FIG. 1B where the device 100 is shown in an assembled or installed configuration. The recharging device 100 has a plurality of internal wires 120 for connecting module 110, batteries 108, and the photovoltaic cells 112. The angled surface 106 has an opening 122 for enabling a user to hang the device 100 on any surface.

The solar powered recharging device 100 can have different shapes and sizes and in the preferred embodiment is of a generally rectangular shape with dimensions 3" (L)×5" (W). The frame 102 can be made of lightweight and insulating material such as plastic. A connecting wire 118 is attached to the batteries 108 for enabling electric power to transfer from the device 100 to external industrial instrument and therefore, enabling a user to use the device 100 as a replacement of conventional Lithium batteries. The charging device 100 provides electric power using renewable energy rather than expensive conventional lithium-ion batteries.

Figure 2:
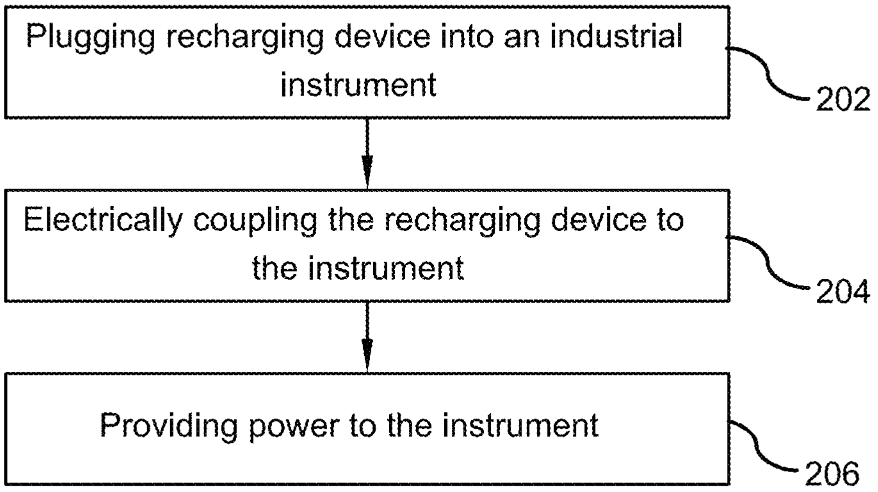
FIG. 2 illustrates a flow diagram depicting a process of working of the industrial instrumentation's solar powered battery charging device of the present invention in accordance with the disclosed architecture.

FIG. 2 illustrates a flow diagram depicting a process of working of the industrial instrumentation's solar powered battery charging device of the present invention in accordance with the disclosed architecture. Initially, the recharging device 100 is plugged into an industrial instrument for providing electric power for functioning of the instrument (Step 202). The recharging device 100 can be plugged into a slot or can be supported using the angled mounting surface 106. Then, the recharging device 100 is electrically coupled to the instrument using the connecting wire 118 (Step 204). The connecting wire 118 can be of different lengths and can be compatible with charging or electrical port of different industrial instruments.

Thereafter, in step 206, electric power stored in the rechargeable batteries 108 of the device 100 is transmitted to the connected industrial instrument. This enables a smooth operation of the instrument without requiring replacing the Lithium batteries of the instrument.

Figure 3:
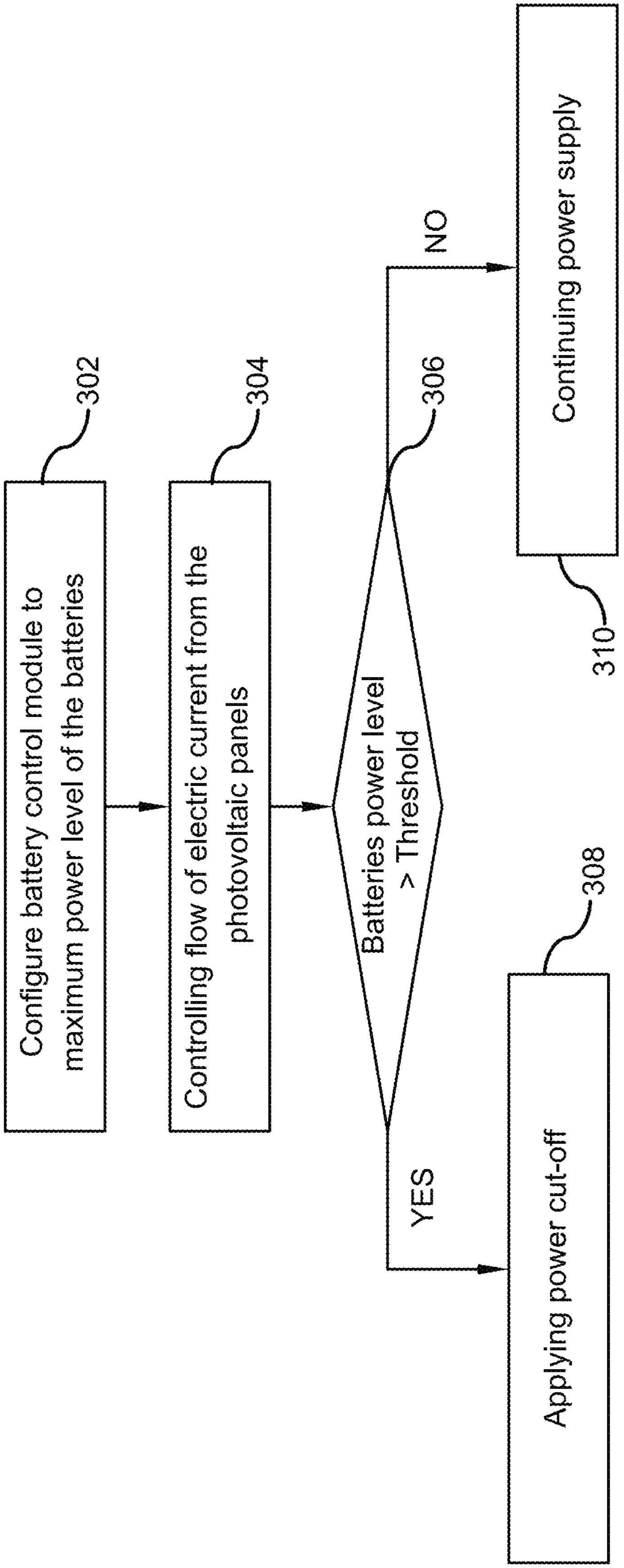
FIG. 3 illustrates a flow diagram depicting a process of controlling recharging of the integrated Lithium batteries of the industrial instrumentation's solar powered battery charging system of the present invention in accordance with the disclosed architecture.

FIG. 3 illustrates a flow diagram depicting a process of controlling recharging of the integrated Lithium batteries of the industrial instrumentation's solar powered battery charging system of the present invention in accordance with the disclosed architecture. Initially, the battery control module 110 is configured to maximum power level of the integrated batteries 108 of the device 100 (Step 302). In some embodiments, the battery control module 110 is reconfigurable enabling a user to easily replace the Lithium batteries 108 for different uses.

Then, the battery control module 110 controls the flow of electric current from the photovoltaic panels 112 to the rechargeable batteries 108 (Step 304). Thereafter, the module 110 determines the power level of the batteries 108 and compares to a threshold which can be 95% of the maximum power level of the rechargeable batteries 108 (Step 306). In situations where the power level of the batteries 108 is more than the threshold, a power cut-off is applied by the module 110 to reduce supply of electric power from the photovoltaic panels 112 to the rechargeable batteries 108 (Step 308). Else, the power supply is continued without any interruption by the module 110 (Step 310).

Figure 4:
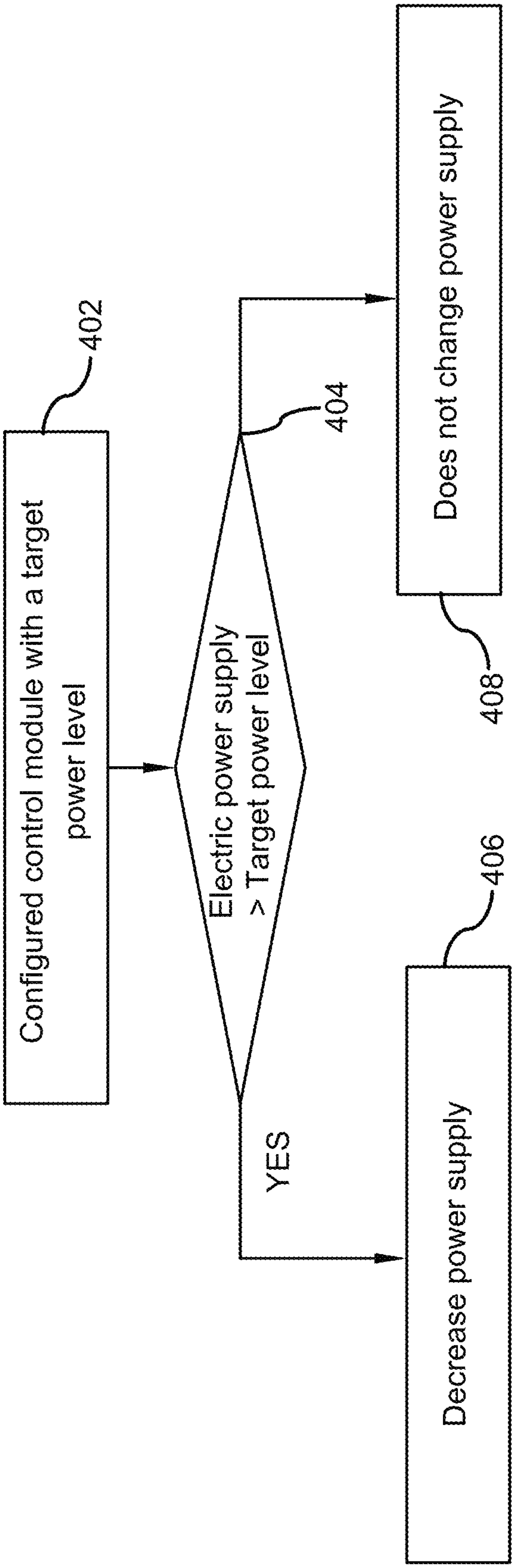
FIG. 4 illustrates a flow diagram depicting a process of controlling electric power discharged from the rechargeable batteries to be compatible with a paired industrial instrument in accordance with the disclosed architecture.

FIG. 4 illustrates a flow diagram depicting a process of controlling electric power discharged from the rechargeable batteries to be compatible with a paired industrial instrument in accordance with the disclosed architecture. Initially, the control module 110 is configured with a target power level required for an instrument to be used with the recharging device (Step 402). The control module 110 can be preconfigured during manufacturing of the device 100 or can be designed to be reconfigured by a user depending on the instrument used with the device 100.

Then, the control module 110 monitors and compares the electric power supply from the rechargeable batteries 108 to the connected instrument with the target power level (Step 404). In situations where the power supply is detected to be more than the target power level, the control module 110 decreases the power supply transmitted from the batteries 108 (Step 406). Else, the control module 110 does not change the power supply from the batteries 108 for providing a steady and calibrated power supply for functioning of the connected industrial instrument (Step 408).

In different embodiments of the present invention, the solar powered recharging device 100 can provide voltage in the range from 3.6V to 36 V and more preferable from 12 V to 24 V. Further, in different embodiments, the device 100 has an efficiency in the range of 95%-99%.

Figure 5:
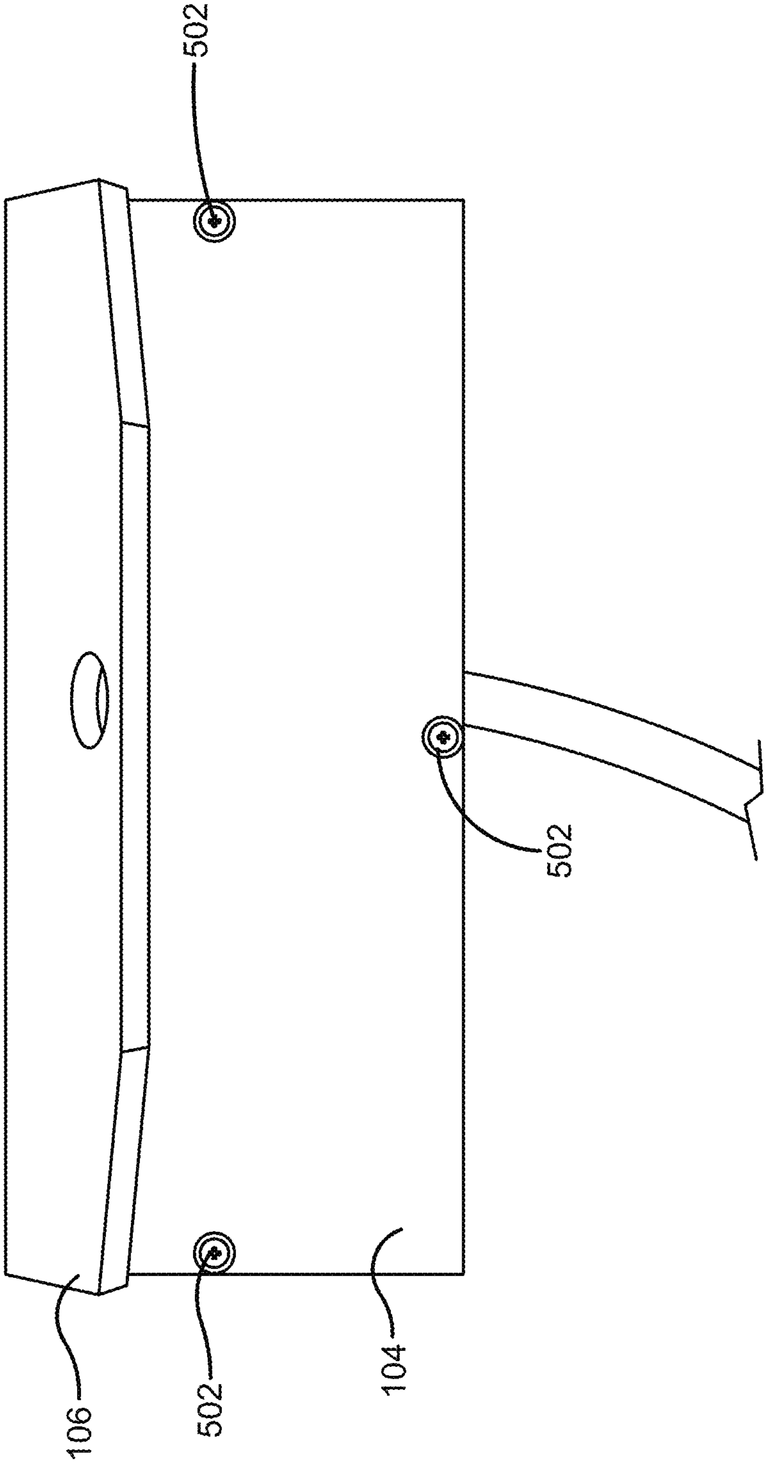
FIG. 5 is a rear perspective view of the recharging device of the present invention in accordance with the disclosed architecture.

FIG. 5 is a rear perspective view of the recharging device of the present invention in accordance with the disclosed architecture. The cover panel 104 of the device 100 has a plurality of fasteners 502 for securing the frame 102. The angled surface 106 can be used for hanging and supporting the device 100 in any orientation to connect to any type of industrial instrument.

Certain terms are used throughout the following description and claims to refer to particular features or components.

As one skilled in the art will appreciate, different persons may refer to the same feature or component by different names. This document does not intend to distinguish between components or features that differ in name but not structure or function. As used herein "industrial instrumentation's solar powered battery charging system", "solar powered recharging device", "charging device", and "device" are interchangeable and refer to the solar powered industrial instrument battery charging device 100 of the present invention.

Notwithstanding the forgoing, the solar powered industrial instrument battery charging device 100 of the present invention can be of any suitable size and configuration as is known in the art without affecting the overall concept of the invention, provided that it accomplishes the above stated objectives. One of ordinary skill in the art will appreciate that the solar powered industrial instrument battery charging device 100 as shown in the FIGS. are for illustrative purposes only, and that many other sizes and shapes of the solar powered industrial instrument battery charging device 100 are well within the scope of the present disclosure. Although the dimensions of the solar powered industrial instrument battery charging device 100 are important design parameters for user convenience, the solar powered industrial instrument battery charging device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial instrumentation's solar powered battery charging system comprising:

a charging device having a battery controller module, a plurality of photovoltaic panels, a frame, a cover panel, a second panel, and an angled mounting surface for mounting said charging device to a supporting surface of the industrial instrumentation;

wherein said frame having a plurality of rechargeable batteries for providing electric power to an industrial instrument to which said charging device is plugged into;

wherein said battery controller module integrated with said charging device configured for controlling recharging of said plurality of rechargeable batteries, further wherein said battery controller module controls charging of said plurality of rechargeable batteries to a maximum level of electric power required for functioning of the industrial instrument in which said charging device is plugged into;

wherein said plurality of photovoltaic panels integrated in said second panel to absorb solar energy to convert into electric power for recharging said plurality of rechargeable batteries;

wherein said battery controller module controls the flow of electric current from said plurality of photovoltaic panels to said plurality of rechargeable batteries to prohibit overheating of said plurality of rechargeable batteries;

wherein said second panel dimensioned to fit with said cover panel for electrical coupling with said plurality of rechargeable batteries;

wherein said charging device having a plurality of internal wires for connecting said battery controller module, said plurality of rechargeable batteries, and said plurality of photovoltaic panels; and further wherein said angled mounting surface having an opening for hanging said charging device onto the supporting surface of the industrial instrumentation.

2. The solar powered battery charger of claim 1, wherein said frame having a lightweight and insulating material comprising a plastic.

3. The solar powered battery charger of claim 2, wherein said charging device having a connecting wire for connecting said plurality of rechargeable batteries to a power source of the industrial instrumentation to enable electric power to transfer from said charging device to the industrial instrumentation.

4. The solar powered battery charger of claim 3, wherein said charging device having a voltage in the range from 3.6 V to 36 V.

5. The solar powered battery charger of claim 3, wherein said charging device having a voltage in the range from 12 V to 24 V.

6. A method of solar powering a battery charger for an industrial instrumentation, the method comprising the steps of:

providing a charging device having a battery controller module, a plurality of photovoltaic panels, a frame, a cover panel, a second panel, and an angled mounting surface for mounting said charging device to a supporting surface of the industrial instrumentation, wherein said frame having a plurality of rechargeable batteries for providing electric power to an industrial instrument to which said charging device is plugged into;

integrating said battery controller module with said charging device configured for controlling recharging of said plurality of rechargeable batteries, wherein said battery controller module controls charging of said plurality of rechargeable batteries to a maximum level of electric power required for functioning of the industrial instrument in which said charging device is plugged into;

integrating said plurality of photovoltaic panels in said second panel;

absorbing solar energy in said plurality of photovoltaic panels to convert into electric power for recharging said plurality of rechargeable batteries;

controlling the flow of electric current from said plurality of photovoltaic panels to said plurality of rechargeable batteries to prohibit overheating of said plurality of rechargeable batteries;

electrically coupling said second panel with said cover panel for connecting said plurality of photovoltaic panels to said plurality of rechargeable batteries, wherein said charging device having a plurality of internal wires for connecting said battery controller module, said plurality of rechargeable batteries, and said plurality of photovoltaic panels;

hanging said angled mounting surface of said charging device onto the supporting surface of the industrial instrumentation; and transmitting power from said charging device to the industrial instrumentation.

7. The method of solar powering a battery charger of claim 6, wherein said frame having a lightweight and insulating material comprising a plastic.

8. The method of solar powering a battery charger of claim 7, wherein said charging device having a connecting wire for connecting said plurality of rechargeable batteries to a power source of the industrial instrumentation to enable electric power to transmit from said charging device to the industrial instrumentation.

9. The method of solar powering a battery charger of claim 8 further comprising the steps of:

comparing the level of electric power of said plurality of rechargeable batteries to a threshold level of electric power, wherein said threshold level is 95% of a maximum level of electric power of said plurality of rechargeable batteries;

controlling recharging of said plurality of rechargeable batteries; and cutting off recharging of said plurality of rechargeable batteries when the level of electric power is greater than said threshold level.

10. The method of solar powering a battery charger of claim 9 further comprising the steps of:

controlling the level of electric power discharging from said plurality of rechargeable batteries to a target discharge level of electric power;

comparing the level of electric power discharging from said plurality of rechargeable batteries to the target discharge level of electric power; and decreasing with said battery control module the level of electric power discharging from said plurality of rechargeable batteries when the target discharge level of electric power is exceeded by the level of electric power discharging from said plurality of rechargeable batteries.

11. The method of solar powering a battery charger of claim 10 further comprising a step of providing voltage with said charging device in the range from 3.6 V to 36 V.

12. The method of solar powering a battery charger of claim 10 further comprising a step of providing voltage with said charging device in the range from 12 V to 24 V.

13. A method of solar powering a battery charger for an industrial instrumentation, the method comprising the steps of:

providing a charging device having a battery controller module, a plurality of photovoltaic panels, a frame, a cover panel, a second panel, and an angled mounting surface for mounting said charging device to a supporting surface of the industrial instrumentation, wherein said frame having a plurality of rechargeable batteries for providing electric power to an industrial instrument to which said charging device is plugged into;

integrating said battery controller module with said charging device configured for controlling recharging of said plurality of rechargeable batteries, wherein said battery controller module controls charging of said plurality of rechargeable batteries to a maximum level of electric power required for functioning of the industrial instrument in which said charging device is plugged into;

integrating said plurality of photovoltaic panels in said second panel;

absorbing solar energy in said plurality of photovoltaic panels to convert into electric power for recharging said plurality of rechargeable batteries;

electrically coupling said second panel with said cover panel for connecting said plurality of photovoltaic panels to said plurality of rechargeable batteries, wherein said charging device having a plurality of internal wires for connecting said battery controller module, said plurality of rechargeable batteries, and said plurality of photovoltaic panels; and transmitting power from said charging device to the industrial instrumentation.

14. The method of solar powering a battery charger of claim 13, wherein said frame having a lightweight and insulating material comprising a plastic.

15. The method of solar powering a battery charger of claim 13, wherein said charging device having a connecting wire for connecting said plurality of rechargeable batteries to a power source of the industrial instrumentation to enable electric power to transmit from said charging device to the industrial instrumentation.

16. The method of solar powering a battery charger of claim 15 further comprising the steps of:

comparing the level of electric power of said plurality of rechargeable batteries to a threshold level of electric power, wherein said threshold level is 95% of a maximum level of electric power of said plurality of rechargeable batteries;

controlling recharging of said plurality of rechargeable batteries; and cutting off recharging of said plurality of rechargeable batteries when the level of electric power is greater than said threshold level.

17. The method of solar powering a battery charger of claim 16 further comprising the steps of:

controlling the level of electric power discharging from said plurality of rechargeable batteries to a target discharge level of electric power;

comparing the level of electric power discharging from said plurality of rechargeable batteries to the target discharge level of electric power; and decreasing with said battery control module the level of electric power discharging from said plurality of rechargeable batteries when the target discharge level of electric power is exceeded by the level of electric power discharging from said plurality of rechargeable batteries.

18. The method of solar powering a battery charger of claim 17 further comprising a step of providing voltage with said charging device in the range from 3.6 V to 36 V.

19. The method of solar powering a battery charger of claim 17 further comprising a step of providing voltage with said charging device in the range from 12 V to 24 V.

20. The method of solar powering a battery charger of claim 17 further comprising a step of hanging said angled mounting surface of said charging device onto the supporting surface of the industrial instrumentation.

* * * * *